(12) United States Patent
Tuthill et al.

(10) Patent No.: US 11,582,946 B2
(45) Date of Patent: Feb. 21, 2023

(54) ANIMAL HOUSE

(71) Applicant: Hebe Studio Limited, Oxfordshire (GB)

(72) Inventors: James Tuthill, Oxford (GB); Johannes Paul, London (GB); Simon Nicholls, Northhamptonshire (GB); William Windham, Banbury (GB)

(73) Assignee: HEBE STUDIO LTD., Oxfordshire (GB)

( * ) Notice: Subject to any disclaimer, the term of this patent is extended or adjusted under 35 U.S.C. 154(b) by 677 days.

(21) Appl. No.: 16/327,401

(22) PCT Filed: Oct. 24, 2017

(86) PCT No.: PCT/GB2017/000156
§ 371 (c)(1),
(2) Date: Feb. 22, 2019

(87) PCT Pub. No.: WO2018/037199
PCT Pub. Date: Mar. 1, 2018

(65) Prior Publication Data
US 2021/0298266 A1 Sep. 30, 2021

(30) Foreign Application Priority Data
Aug. 24, 2016 (GB) ...................... 1614451

(51) Int. Cl.
*A01K 1/03* (2006.01)
*A01K 31/00* (2006.01)

(52) U.S. Cl.
CPC ............... *A01K 1/03* (2013.01); *A01K 31/00* (2013.01); *A01K 31/005* (2013.01)

(58) Field of Classification Search
CPC ........ A01K 31/00; A01K 1/03; A01K 31/005; A01K 31/18; A01K 1/00; A01K 1/032; A01K 1/033; A01K 1/034; E04C 2/20
See application file for complete search history.

(56) References Cited

U.S. PATENT DOCUMENTS

| | | | | |
|---|---|---|---|---|
| 3,129,526 | A | * | 4/1964 | Pamula ................... A63H 3/52 52/473 |
| 5,081,956 | A | * | 1/1992 | Greitzer ................. A01K 1/033 119/500 |

(Continued)

FOREIGN PATENT DOCUMENTS

| | | | | |
|---|---|---|---|---|
| GB | 2213849 | A | * 8/1989 | ............. E04C 2/205 |
| KR | 20090088093 | A | * 8/2009 | ............. A01K 1/033 |
| KR | 20100025084 | A | * 3/2010 | ............. A01K 1/033 |

OTHER PUBLICATIONS

Chemical Retrieval on the Web (CROW) "Polymer Properties Database" https://polymerdatabase.com/polymer%20physics/sigma.html. Accessed Aug. 25, 2021 (Year: 2021).*

(Continued)

*Primary Examiner* — Peter M Poon
*Assistant Examiner* — Carly W. Lynch
(74) *Attorney, Agent, or Firm* — Taft Stettinius & Hollister LLP; Stephen F. Rost

(57) ABSTRACT

The invention provides an animal house comprising an impermeable hollow-moulded structure 210 having at least one convex surface 219. The structure comprises a first flat surface 214 extending in a first direction and a second flat surface 213 extending in a second direction. The convex surface 219 connects the first flat surface 214 to the second flat surface 213. The structure 210 further comprises a rib 230 defining a sharp edge. The rib 320 is configured to be releasably attached proximate to or on the convex surface 219 such that the rib 230 diverts a liquid flowing over the (Continued)

convex surface 219 away from the structure 210. The invention also provides an impermeable hollow-moulded panel 810 with protruding ridges 800, 801 to prevent water ingress.

17 Claims, 8 Drawing Sheets

(56) References Cited

U.S. PATENT DOCUMENTS

| | | | | |
|---|---|---|---|---|
| 5,551,371 | A * | 9/1996 | Markey | A01K 1/033 |
| | | | | 119/165 |
| 7,458,336 | B2 * | 12/2008 | Eu | A01K 1/033 |
| | | | | 119/163 |
| 8,973,318 | B2 * | 3/2015 | Hammond | E04C 2/38 |
| | | | | 52/223.7 |
| 2009/0159013 | A1 * | 6/2009 | Anderson | A01K 1/033 |
| | | | | 119/482 |
| 2010/0050556 | A1 * | 3/2010 | Burns | E04B 1/34321 |
| | | | | 52/592.1 |
| 2011/0247567 | A1 * | 10/2011 | Chan | A01K 1/033 |
| | | | | 119/416 |
| 2017/0247882 | A1 * | 8/2017 | Krause | E04F 13/0821 |

OTHER PUBLICATIONS

"Ridge." Merriam-Webster.com Dictionary, Merriam-Webster, https://www.merriam-webster.com/dictionary/ridge. Accessed Jun. 30, 2022 (Year: 2022).*

"Spine." Collins.com Dictionary, Collins, https://www.collinsdictionary.com/US/dictionary/english/spine. Accessed Jun. 30, 2022 (Year: 2022).*

\* cited by examiner

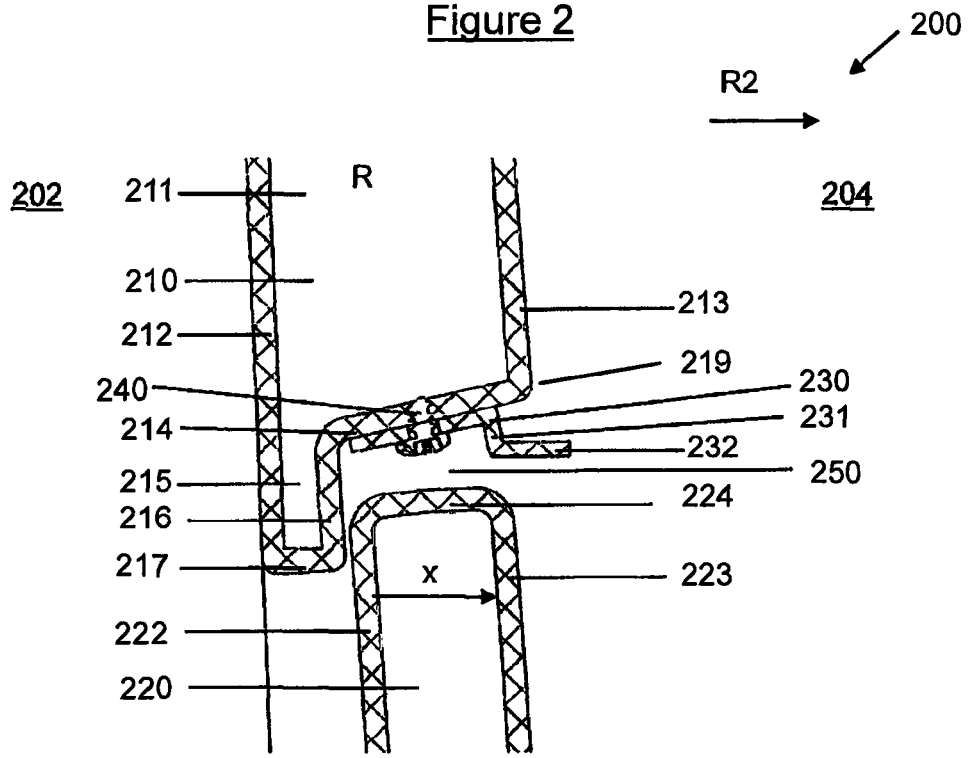
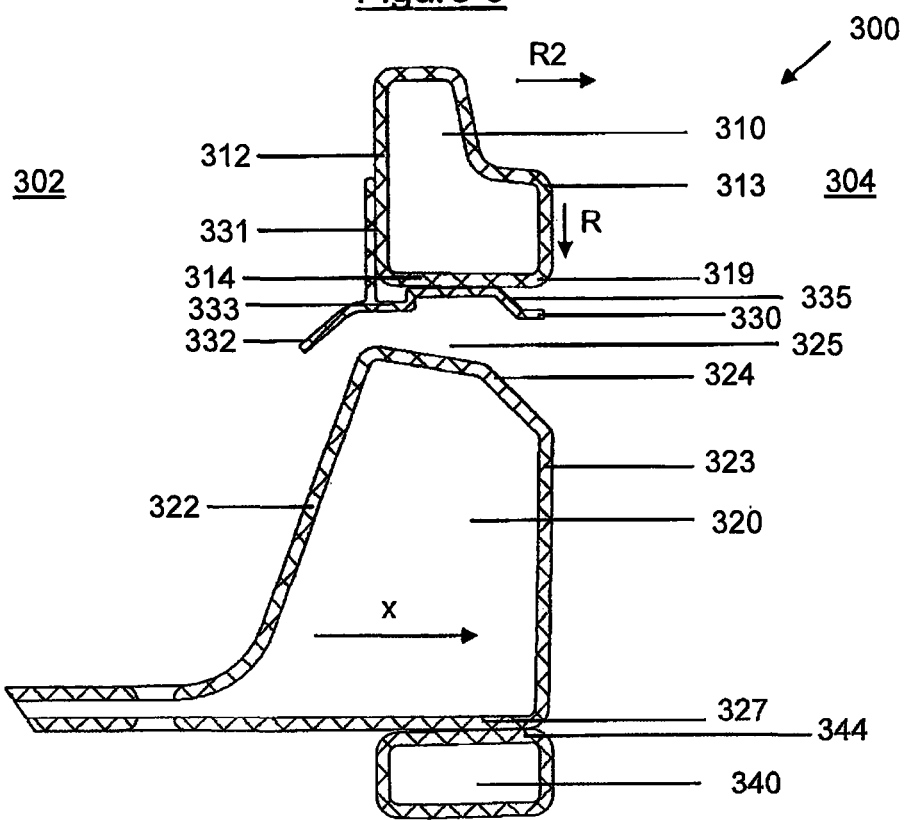

Figure 12
SECTION A-A
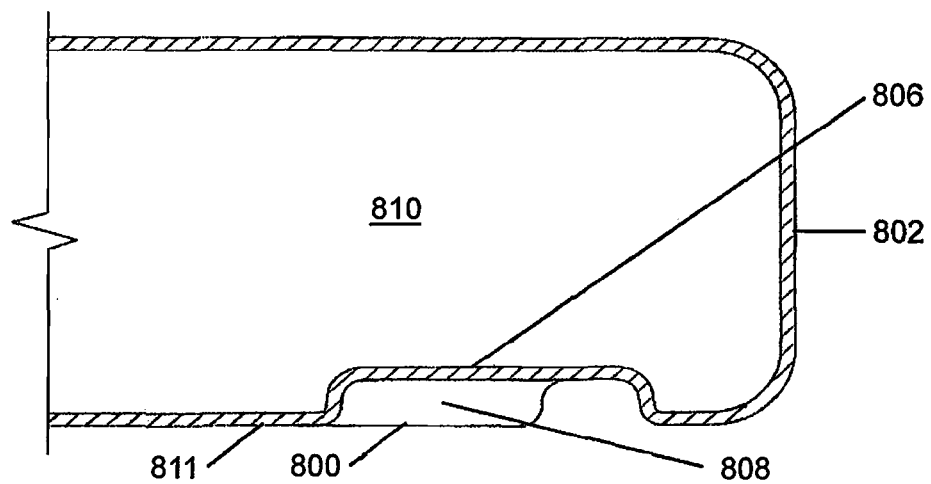
DETAIL B
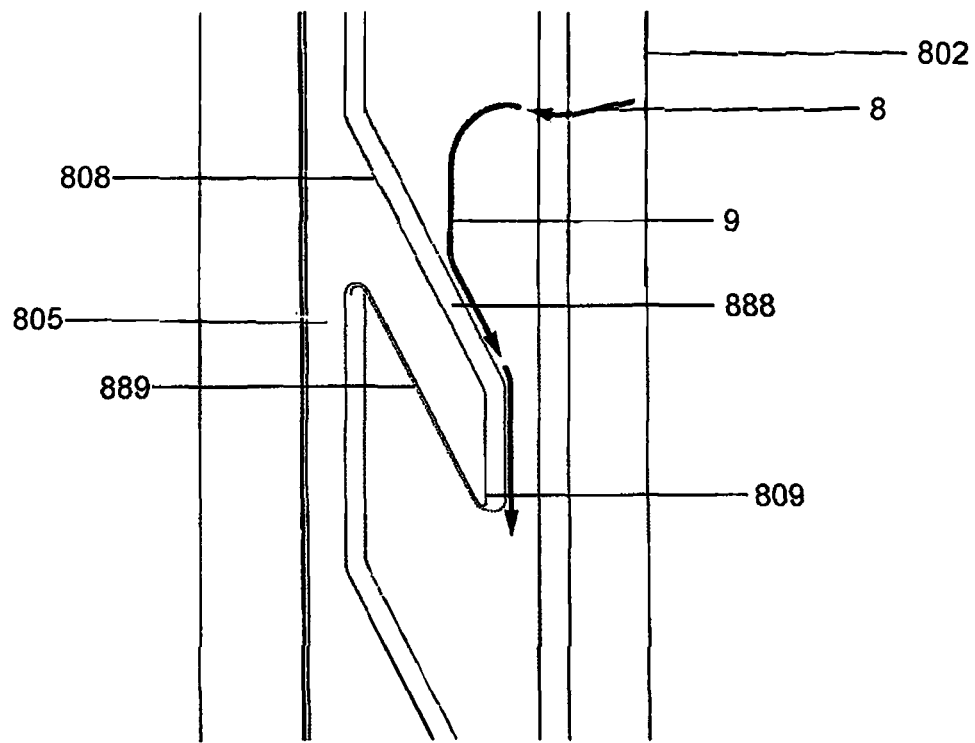

ANIMAL HOUSE

This application is a U.S. national stage application under 35 U.S.C. § 371 of PCT International Application Serial No. PCT/GB2017/000156, which has an international filing date of Oct. 24, 2017, designates the United States of America, and claims the benefit of GB Application No. 1614451.1, which was filed on Aug. 24, 2016, the disclosures of which are hereby expressly incorporated by reference in their entirety.

FIELD

The present invention relates to an animal house comprising an impermeable hollow-moulded structure and waterproof features therefor.

BACKGROUND

One example of an animal house is a hen house, which is used to keep chickens and other types of poultry. These hen houses serve to shelter chickens at night. They provide protection for both the chickens and their eggs from predators such as foxes, as well as shelter from any inclement weather.

It is known to use plastic panels to make up such animal houses. These panels may be made by hollow-moulding processes, such as blow-moulding, injection blow-moulding, injection stretch blow-moulding, and rotational-moulding. The panels of the structure are fitted together by various fastening means to form the walls and a roof of the animal house.

There are various limitations and problems with using hollow-moulded panels for the walls and roof of an animal house.

One main limitation is related to the shapes that can be produced. For example, when blow-moulding a large component, the radius of curvature achievable on the edges has a minimum limit in relation to the distance of those edges as a function of the tool geometry. In some cases, this prevents the formation of sharp edges. This is due to the minimum wall thickness required in order to ensure the blow-moulded component has sufficient structural integrity. It is also desirable to maintain a consistent thickness of plastic throughout the part to help maintain its strength, ensure the part is moulded reliably and to keep material usage to a minimum. The tooling is therefore designed to allow the plastic to stretch in a consistent manner over the whole part.

During the blow-moulding process, a malleable/fluid plastic body is inserted into a mould. A pressurized gas is applied at the inlet of the body and the body is stretched and forced against the inside walls of the mould by the gas. The mould is cooled and then removed. The resulting plastic body has an outer shape which mimics the inner shape of the mould, and an inner shape defining a hollow cavity. The wall thickness of the plastic body varies depending on local topography of the mould. For example, at sharp edges or corners, the walls of the plastic body are thinner. The walls of the plastic body may also be thinner the further they are from the gas inlet or centreline. Sharp edges and corners of the plastic body that are distal to the gas inlet may be particularly thin. Thin walls are often undesirable as they can easily be broken and reduce the quality and reliability of the final product.

In order to avoid thin regions of the plastic body, moulds without sharp corners or edges can be used. Alternatively, moulds with sharp edges can be used, but the gas pressure can be adjusted so that the plastic body is not forced completely into any corners or edges. Both of these solutions provide hollow-moulded plastic bodies with rounded edges and corners having a larger radius of curvature than that achievable by other plastic forming methods, such as injection-moulding.

Hen houses which comprise hollow-moulded plastic boards can have problems with remaining water-tight. The panels may be assembled to leave small gaps between adjacent panels to allow for manufacturing tolerances, and to allow for ease of assembly. These small gaps may allow water ingress, either through capillary action, or by wind action. One problem that results from the lack of sharp edges of hollow-moulded panels is that water can track along rounded convex edges and into the animal house through the small gaps. In particularly heavy rainfall, a large amount of water may end up flowing down the outside of the hen house. This may then stay attached to the outside surface even at the rounded edge due to the Coandă effect. The water may then track around the rounded edge and inside the hen house. This problem is not prevalent with wooden structures which can absorb water to a certain extent, or plastic structures with sharp edges.

The present invention has been devised with the foregoing in mind.

SUMMARY

In accordance with a presently preferred embodiment of the present invention, there is provided an animal house comprising: an impermeable structure having at least one convex surface, a first flat surface extending in a first direction and a second flat surface extending in a second direction, the convex surface connecting the first flat surface to the second flat surface; and a rib defining a sharp edge, wherein the rib is configured to be releasably attached adjacent to the convex surface such that the rib diverts a liquid flowing over the convex surface away from the structure.

In use, the rib is able to divert water away from the convex surface so as to prevent the water flowing along the first flat surface towards the inside of the animal house. The sharp edge of the rib ensures that the water separates from the structure and does not flow onto the first flat surface towards the inside of the animal house. The rib thus provides a way of making a hollow-moulded animal house waterproof.

The convex surface may have a radius of curvature of between 1 mm and 100 mm.

The rib may have a planar portion, and the rib may be attached to the structure first flat surface at the rib planar portion. The planar portion enables easier alignment and assembly of the rib to the structure.

The sharp edge may be offset from the first flat surface, defining a gap therebetween. In use, this allows water already separated from the first and second surfaces, but having a component of velocity in a direction opposite to the first direction, to be intercepted by the rib.

The rib planar portion may be configured to form a seal with the first flat surface of the structure. The seal prevents any tracked water reaching the inside of the animal house.

The rib may have a portion extending in the first direction.

The first direction and the second direction may be substantially orthogonal. The first direction may be substantially vertical. The second direction may be substantially horizontal.

The second flat surface may define a plane, and the rib may be arranged such that it terminates within or proximate to the plane of the second surface. This arrangement avoids use of any parts which protrude substantially away from the animal house, which could provide obstacles to a person accessing the animal house, could be easily broken or snapped off, or may reduce the aesthetic quality of the animal house.

The convex surface of the structure may comprise a material having a surface tension value substantially between 20 and 50 mN/m. The convex surface of the structure may comprise a polymeric material.

The structure may be a blow-moulded structure. The structure may be a rotational-moulded structure.

The rib may be a single unitary piece. The rib may thus be manufactured at low cost.

The rib may comprise two or more attachable unitary pieces. The rib may thus be easily stored and transported.

The rib may have a cross-section, the cross section being one of: an L-shape; a Z-shape; an arc shape; a top-hat shape; or rectangular. Each cross section has various advantages. The most suitable cross-section for the rib will depend on the relative dimensions of the structure, the location of the rib and the particular component to which the rib is attached.

The structure first flat surface may define a flat-bottomed channel, and the rib may be configured to be partially received within the channel. This arrangement provides an improved seal, by providing a further barrier to water ingress, as the seal is provided at a higher level than the curved surface of the structure. The flat-bottomed channel also acts as a guide to facilitate assembly.

The impermeable hollow-moulded structure may be a wall panel or a roof panel of the animal house.

According to a presently preferred second embodiment of the invention, there is provided an impermeable hollow-moulded panel for an animal house having a recessed first end portion adjacent a first edge, the first end portion having a series of protruding ridges connected by a protruding spine, the spine extending substantially in parallel with the first edge and the series of ridges extending at an angle of between 5° and 80° to the first edge. This aspect of the invention provides an alternative solution to the problem of water ingress into a hollow-moulded animal house. The protruding ridge acts as a guide, to guide water which may have tracked along a curved surface away from the inside of the animal house.

The ridges in the series of protruding ridges may be parallel to each other. This arrangement may provide the best cover to prevent water tracking towards the inside of the animal house.

Another aspect of the invention relates to an animal house comprising: an impermeable hollow-moulded structure having at least one convex surface, a first flat surface extending in a first direction and a second flat surface extending in a second direction, the convex surface connecting the first flat surface to the second flat surface; and a rib defining a sharp edge, wherein the rib is configured to be releasably attached proximate to or on the convex surface such that the rib diverts a liquid flowing over the convex surface away from the structure. The convex surface may have a radius of curvature of between 1 mm and 100 mm. The rib may have a planar portion, and the rib may be attached to the structure first flat surface at the rib planar portion. In one implementation, the sharp edge is offset from the first flat surface, defining a gap therebetween.

Preferably the rib planar portion is configured to form a seal with the first flat surface of the structure. The rib may comprise a portion extending in the first direction. The first direction and the second direction may be substantially orthogonal, for example wherein the first direction is substantially vertical and the second direction is substantially horizontal. The second flat surface may define a plane, and the rib may be arranged such that it terminates within or proximate the plane of the second surface. The convex surface of the structure may comprise a material having a surface tension value substantially between 20 mN/m and 50 mN/m. The convex surface of the structure may comprise a polymeric material. The structure may be a blow-moulded structure. The rib may be either a single unitary piece or comprise two or more attachable unitary pieces. In one implementation the rib has a cross-section, the cross section being one of: an L-shape; a Z-shape; an arc shape; a top-hat shape; or rectangular. Preferably the structure first flat surface defines a flat-bottomed channel, and the rib is configured to be partially received within the channel. The impermeable hollow-moulded structure may be a wall panel or a roof panel of the animal house.

Another aspect of the invention relates to an impermeable hollow-moulded panel for an animal house having a recessed first end portion adjacent a first edge, the first end portion having a series of protruding ridges connected by a protruding spine, the spine extending substantially in parallel with the first edge and the series of ridges extending at an angle of between 5° and 80° to the first edge. In one arrangement, the ridges in the series of protruding ridges are parallel to one another. A further aspect of the invention relates to an animal house comprising one or more of these impermeable hollow-moulded panels.

Another aspect of the invention provides an animal house comprising: impermeable structure means, said structure means having at least one convex surface, a first flat surface extending in a first direction and a second flat surface extending in a second direction, the convex surface connecting the first flat surface to the second flat surface; and liquid diverting means defining a sharp edge, wherein the liquid diverting means is configured to be releasably attached proximate to or on the convex surface such that the liquid diverting means diverts a liquid flowing over the convex surface away from the structure means.

A further aspect of the invention provides: impermeable hollow-moulded panel means for an animal house, the panel means having a recessed first end portion adjacent a first edge, the first end portion having a series of protruding fluid guiding means connected by a protruding spine, the spine extending substantially in parallel with the first edge and the series of fluid guiding means extending at an angle of between 5° and 80° to the first edge.

BRIEF DESCRIPTION OF THE DRAWINGS

Various aspects of the teachings of the present invention, and arrangements embodying those teachings, will hereafter be described by way of illustrative example with reference to the accompanying drawings, in which:

FIG. 2 is a cross-section of an embodiment of the first aspect of the present invention, with a portion of an animal house comprising a wall and a door;

FIG. 3 is a cross-section of an embodiment of the first aspect of the present invention, with a portion of an animal house comprising an upper wall, a lower wall and a tray;

FIG. 12 is a simplified cross-sectional view taken at line A-A of FIG. 11 and an enlarged perspective view of a ridge at detail B of FIG. 11;

DETAILED DESCRIPTION

Figure 1:
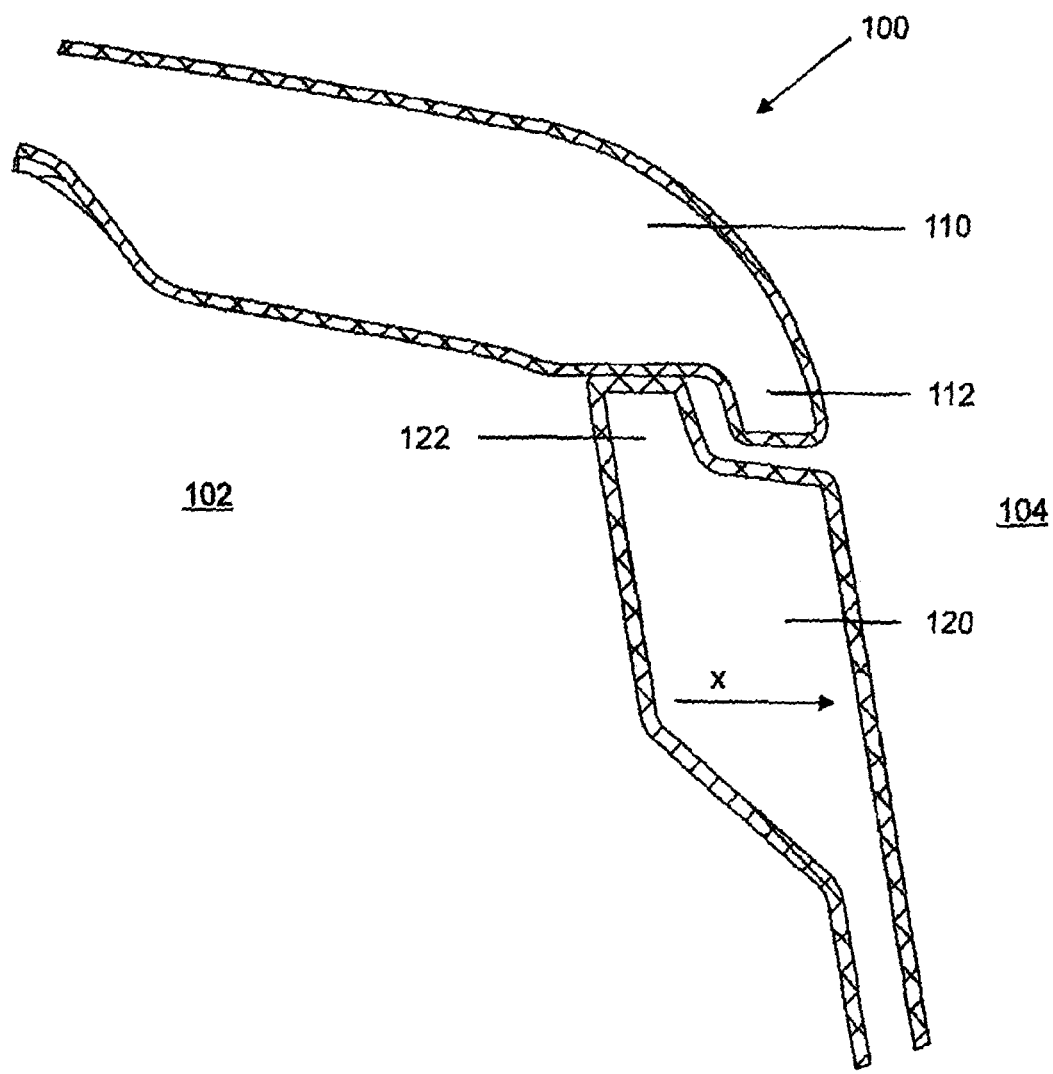
FIG. 1 is a cross-section of a portion of a prior art animal house comprising a roof and a wall.

With reference to FIG. 1, a prior art partial solution to the water ingress problem described above is provided. FIG. 1 shows a portion of an animal house 100 defining an interior region 102 and external region 104. The external region 104 is exposed to the atmosphere.

The animal house 100 has a roof panel 110 and a side panel 120. The roof panel 110 has a roof protruding part 112, and the side panel 120 has a side protruding part 122. A seal is provided by overlap of the roof protruding part 112 and the side protruding part 122. Any water that tracks around the convex surface of the roof protruding part 112 is prevented from entering the internal region of the animal house by the side protruding part 122. Instead, the water falls along the external region side of the side panel 120.

This prior art solution to the water ingress problem has various limitations. One limitation is that the side panel 120 cannot be moved in the direction of the arrow x without vertical or horizontal displacement, so as to avoid clashing with the overlap of the roof panel. This means that for removable parts such as trays or doors which are restrained for such displacements, this prior art solution cannot be used.

FIG. 2 shows a first embodiment of the first aspect of the present invention. A portion of an animal house 200 defines an interior region 202 and an exterior region 204. The animal house 200 has an upper wall panel 210, a lower wall panel 220, a rib 230 and a screw 240.

The upper wall panel 210 has a hollow main body 211 and a protruding part 215. The hollow main body 211 is defined by an inner wall 212, an outer wall 213 and a rear wall 214. The outer wall 213 and the rear wall 214 are joined by a convex surface 219. The protruding part 215 shares the inner wall 212 with the main body 211, and has an outer wall 216 and a rear wall 217.

The lower wall panel 220 has a hollow main body 221 defined in part by an outer wall 223, an inner wall 222 and a top wall 224. The lower wall panel 220 may be a door providing access to interior region 202 of animal house 200.

The rib 230 is elongate, Z-shaped in cross section, and has a ledge 231. The rib 230 terminates in a sharp edge 232. The rib 230 is a single unitary piece of plastic, preferably high-density poly(ethylene) (HDPE).

Used herein, the term "sharp" should be interpreted as "sharper than" the convex surface of the impermeable hollow-moulded structure. The specific form and arrangement of the "sharp" component is arbitrary save as to be sharp enough so as to prevent wicking of water droplets around the edge 232, but instead to cause separation of water droplets from the rib 230. For example, a sharp edge may taper to a point, or be provided as an edge which in cross-section defines three orthogonal sides, such as the outermost part of the rib 230 shown in FIG. 2. The term "sharp" may also refer to a rounded edge with a smaller radius of curvature than the convex surface of the impermeable hollow-moulded structure, as long as such an edge causes separation of water droplets and prevents wicking of the water droplets.

The term "outermost" used herein to describe part of a component refers to the furthest part of a component away from the inside of an animal house. The term "innermost" used herein to describe part of a component refers to the furthest part of a component towards the centre of an animal house.

The upper wall panel 210 and the lower wall panel 220 are aligned such that there is a gap 250 between the rear wall 214 of the upper wall panel 210 and the top wall 224 of the lower wall panel 220. The upper wall panel 210 and the lower wall panel 220 are aligned such that the protruding part 215 of the upper wall panel 210 overlaps the lower wall panel 220. The outer wall 216 of the protruding part is proximate the inner wall 222 of the lower wall panel 220.

The rib 230 is attached to the rear wall 214 of the upper wall panel 210 by a fastener. The fastener is a screw 240. The rib 230 is attached to the rear wall 214 such that the rib 230 is disposed in the gap 250, and such that the contact between the upper surface of the rib 230 and the lower surface of the rear wall 214 provides a water tight seal. The rib 230 extends beyond a plane defined by the outer wall 213 of the main body 211 of the upper wall panel 210.

In the event that water runs along the surface 213 in the direction of arrow R, water can track along the convex surface 219 and gain momentum with a component in a direction perpendicular the arrow R, in particular in a direction of ingress to the animal house. Water is then prevented from entering the internal region 202 of the animal house 200 by the ledge 231 of the rib 230. As the rib 230 and the rear wall 217 have a water-tight seal, no water can pass between the rib 230 and the rear wall 217. Water is forced to travel along the rib 230 in the direction of arrow R2, away from the upper wall panel 210 and the lower wall panel 220. Particularly, water is forced away from the gap 250. As water reaches the outermost part of the rib 230, it continues in the direction of arrow R2 before returning to the direction of arrow R due to gravity. In contrast to tracking along the convex surface 219, water does not track along the outermost part of the rib 230. This is because the rib 230 has the sharp edge 232.

In contrast to the prior art solution described with reference to FIG. 1, the rear wall panel 220 of the first embodiment of the present invention can be moved in the direction of arrow x. Thus, in this case, the rear wall panel 220 can be removed from upper wall panel 210 in order to gain access to the interior region 202 of animal house 200 without vertical and/or horizontal displacement of the rear wall pane 220.

FIG. 3 shows a second embodiment of the present invention, 300, 302, 304, in which there is an upper wall panel 310, a lower wall panel 340, a removable tray 320, and a rib 330.

The upper wall panel 310 has an inner wall 312, an outer wall 313, and a rear wall 214.

The outer wall 313 and the rear wall 314 are joined by a convex surface 319.

The removable tray 320 has an inner wall 322, an outer wall 323, a top wall 324 and a rear wall 327.

The lower wall panel 340 has a top wall 344.

The rib 330 has a first leg 331, a second leg 332 and a third leg 333. The first leg 331 is straight and elongate in cross-section. The second leg 332 is substantially straight and elongate. The third leg 333 is elongate and has two z-shaped parts in cross-section. The outermost z-shapes part defines a ledge 335. The third leg 333 is substantially orthogonal to the first leg 331.

The upper wall panel 310 and the lower wall panel 340 are connected (which can be seen in FIG. 13) and define a cavity which receives the removable tray 320. Part of the rear wall 327 of the removable tray 320 contacts and rests on the top wall 344 of the lower wall panel 340.

A gap 325 is defined between the upper wall panel 310 and the removable tray 320.

The rib 330 is disposed in the gap 325. The rib 330 is attached to the upper wall panel 310. The first leg 331 of the rib 330 is aligned with and in contact with the inner wall 312 of the upper wall panel 310. The second leg 332 of the rib 330 extends away from the upper wall panel 310 towards the inside 302 of the animal house. The outermost part of the third leg 333 extends away from the rear wall 314 of the upper wall panel 310. The third leg 333 of the rib 330 has a contact part which is aligned with and in contact with the rear wall 314 of the upper wall panel 310, such that it provides a water-tight seal along the contact part. The third leg 333 extends up to a plane defined by the outer wall 313 of the upper wall panel 310.

The third leg 333 of the rib 330 has the same function as the rib 230 of the first embodiment. In the event that water runs along the surface 313 in the direction of the arrow R, water can track along the convex surface 319 and gain momentum with a component in a direction perpendicular to the arrow R, in particular in a direction of ingress to the animal house. Water is then stopped by the ledge 335 of the third leg 333 of the rib 330. As the third leg 333 and the rear wall 314 have a water-tight seal, no water can pass between the third leg 333 and the rear wall 314. Water is forced to travel along the third leg 333 in the direction of arrow R2, away from the upper wall panel 310, lower wall panel 340 and removable tray 320.

Particularly, water is forced away from the gap 325. As water reaches the outermost part of the third leg 333, it continues in the direction of arrow R2 before returning to the direction of arrow R due to gravity. As described before in relation to the first embodiment, in contrast to tracking along the convex surface 319, water does not track along the outermost part of the rib 330. This is because the rib 330 has a sharp edge.

In contrast to the prior art solution described with reference to FIG. 1, removable tray 320 can be moved in the direction of arrow x.

Figure 4:
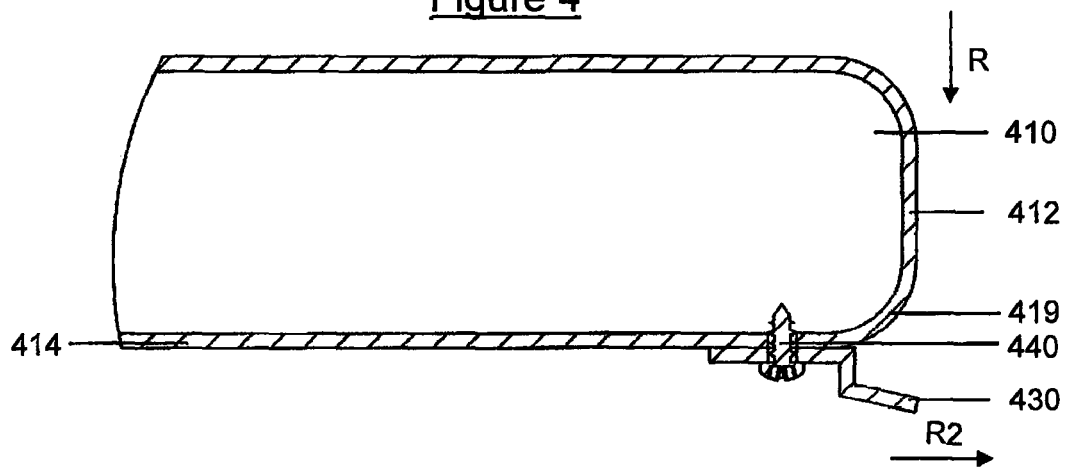
FIG. 4 is a cross-section of an embodiment of the first aspect of the present invention, with a portion of an animal house comprising a roof panel.
Figure 5:
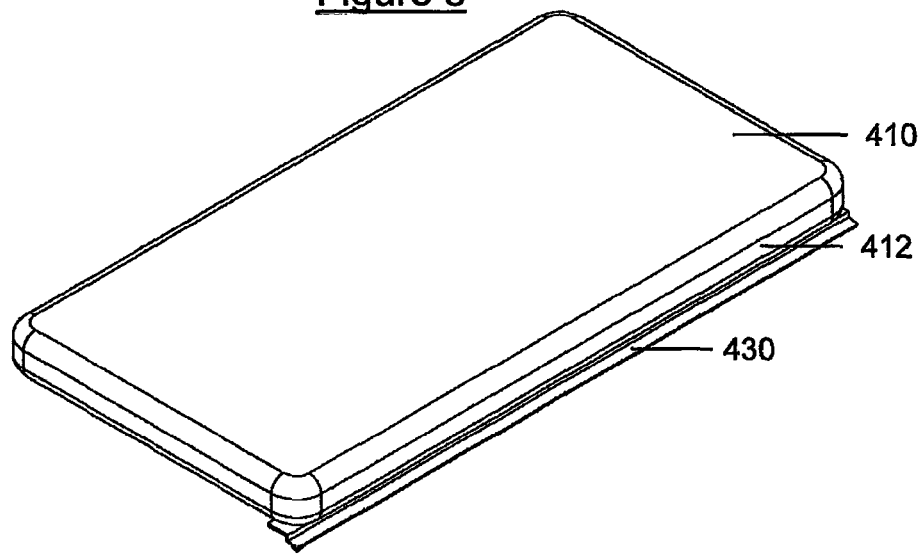
FIG. 5 is a perspective view of the embodiment shown in FIG. 4.
Figure 6:
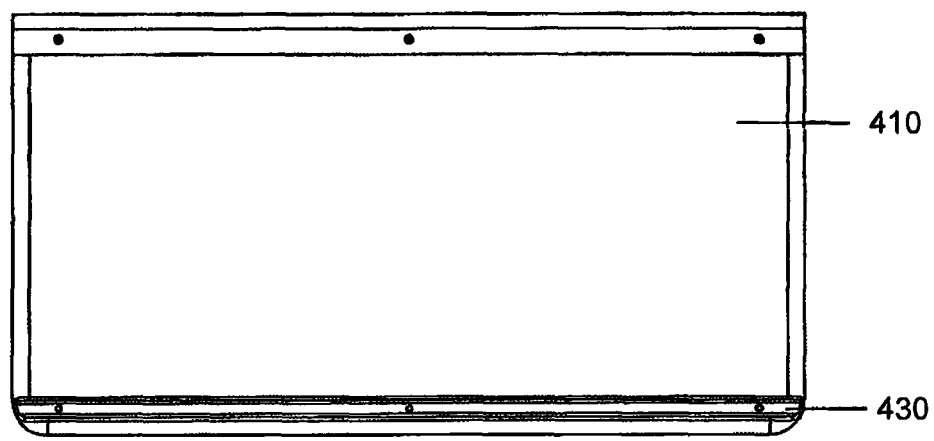
FIG. 6 is a bottom view of the embodiment shown in FIG. 5.

FIGS. 4, 5 and 6 show a cross section, a perspective view and a back view respectively of a third embodiment of the invention. The rib 430 is the same as the rib 230 of the first embodiment, hence features of the rib 230, 430 described previously will not be repeated.

In this embodiment, the animal house comprises a flat roof panel 410. The flat roof panel 410 has an outer wall 412, a back wall 414 and a convex surface 419. The outer wall 412 and the back wall 414 are joined by the convex surface 419. The rib 430 is attached to the back wall 414 by a screw 440, such that a water-tight seal is provided between the back wall 414 and the rib 430.

The rib 430 extends along the outer wall 412, as shown by FIGS. 5 and 6.

The ribs 230, 330 of the first and second embodiments (described previously in relation to FIGS. 2 and 3) extend along the outer walls 213, 313 respectively, in the same manner as that shown by the perspective and back views of the third embodiment (FIGS. 5 and 6).

Figure 7:
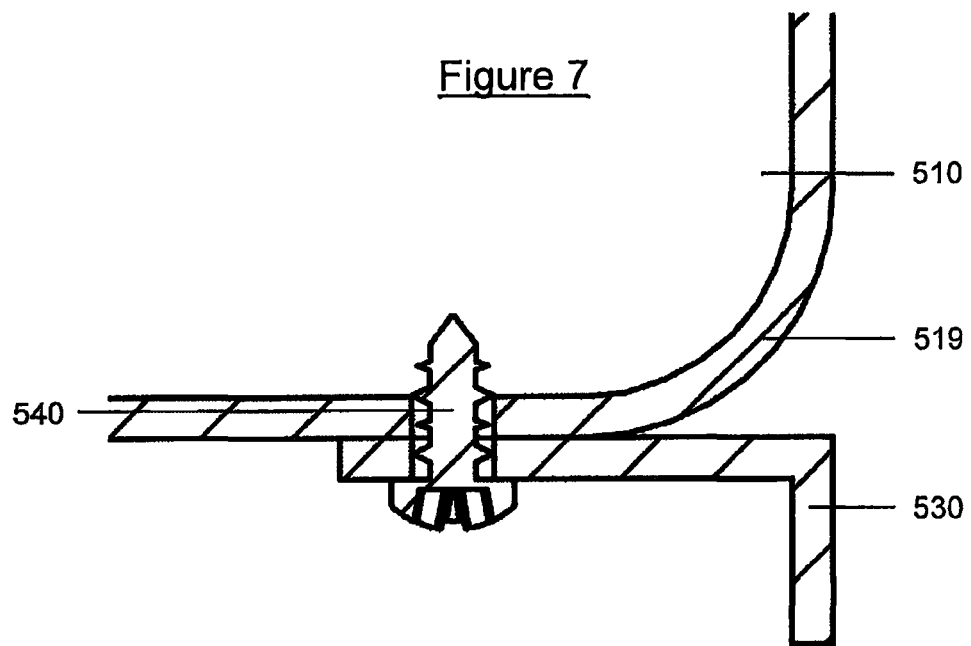
FIG. 7 is an enlarged cross-section view of a roof panel according to a further embodiment of the first aspect of the present invention.
Figure 8:
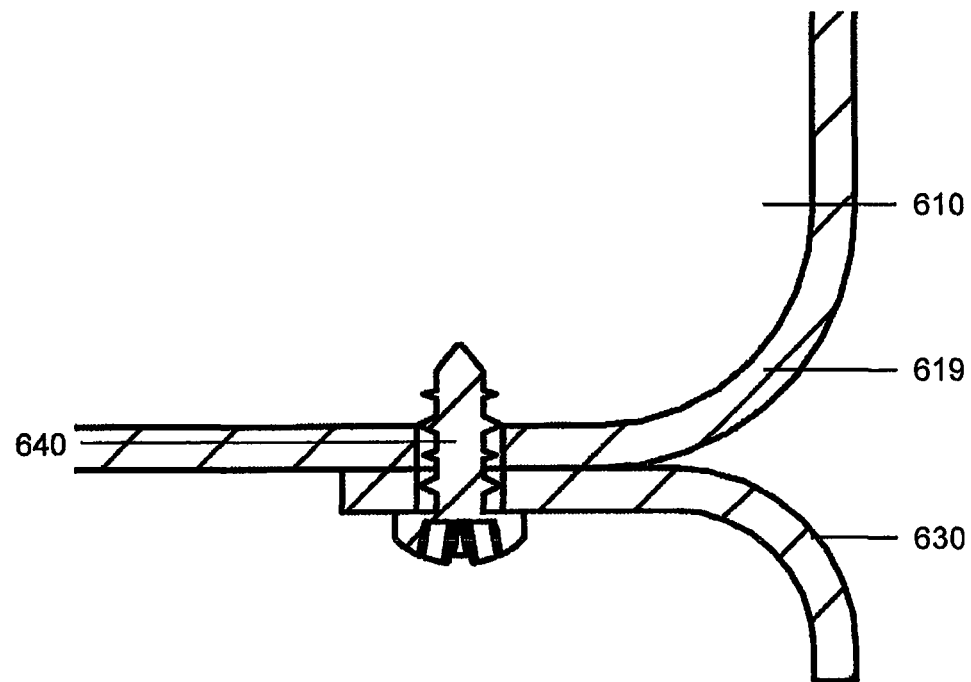
FIG. 8 is an enlarged cross-section view of a roof panel according to a further embodiment of the first aspect of the present invention.

FIGS. 7 and 8 respectively show third and fourth embodiments of the first aspect of the present invention. The panels 510, 610 may be the same as any of the components 210, 310 or 410 described respectively in any of the first, second or third embodiments.

The third embodiment, shown in FIG. 7, comprises a rib 530 with an L-shaped cross section. The fourth embodiment, shown in FIG. 8, comprises a rib 630 with an arc-shaped cross section.

Figure 9:
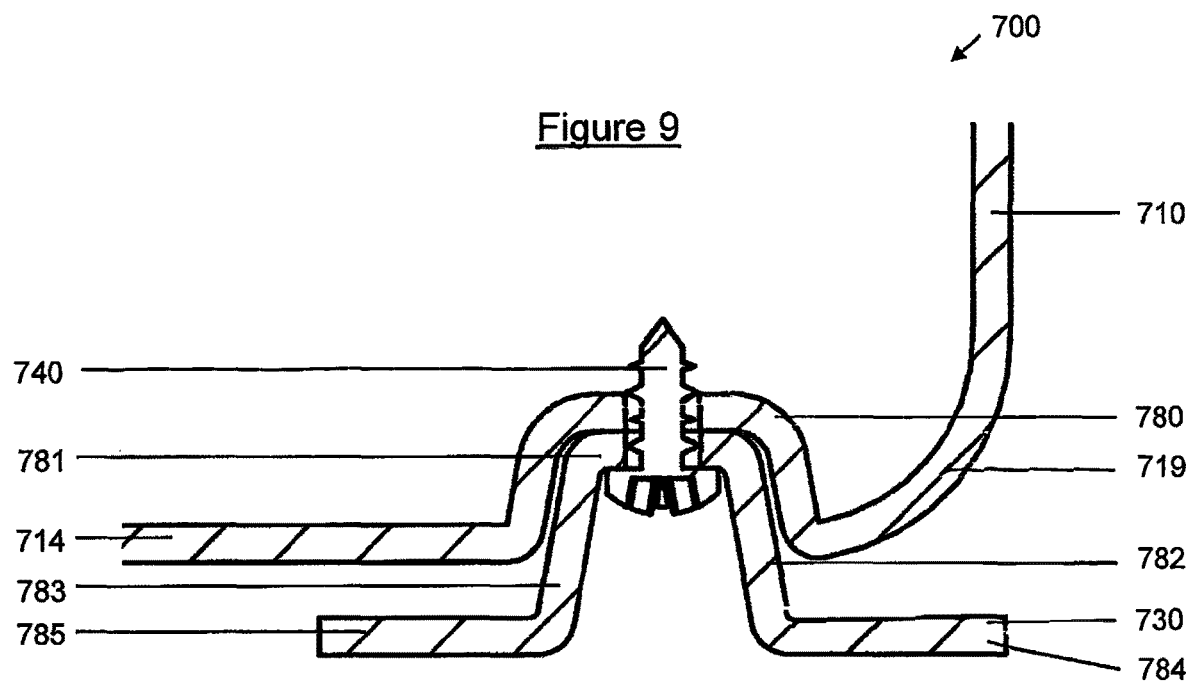
FIG. 9 is an enlarged cross-section view of a roof panel according to a further embodiment of the first aspect of the present invention.
Figure 10:
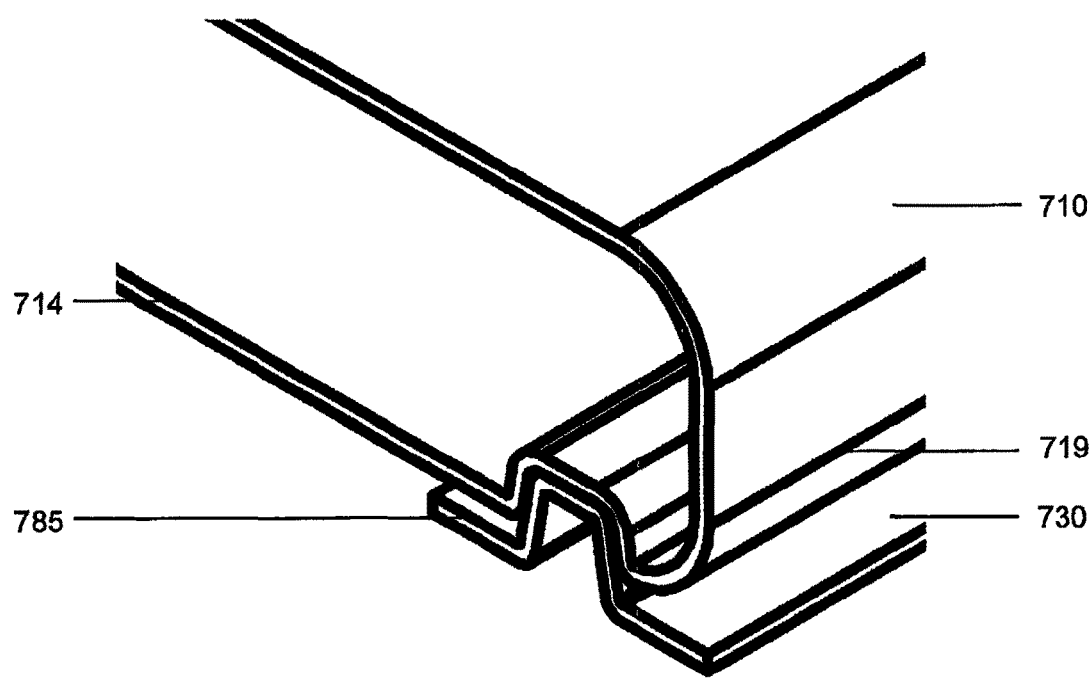
FIG. 10 is a perspective view of the embodiment of FIG. 9.

FIGS. 9 and 10 show a fifth embodiment of the present invention.

The fifth embodiment, shown in FIGS. 9 and 10, comprises a hollow-moulded structure 710 and a rib 730 with a top-hat shaped cross-section. The rib 730 has a flat top part 781, two flat side parts 782, 783 and two flat rim parts 784, 785.

The hollow-moulded structure 710 has a convex surface 719 and a rear surface 714. The hollow-moulded structure 710 may be substantially the same as the component 410 described previously. However, the hollow-moulded structure 710 differs from the embodiments described previously in that it has a channel 780.

The channel 780 is configured to receive the top part 781 and the two side parts 782, 783 of the rib 730. The top part 781 is connected to the hollow-moulded structure by a screw 740, such that a water tight seal is provided between the hollow-moulded structure and the top part 781 of the rib 730. The two rim parts 784, 785, extend parallel to a plane defined by the rear wall 714 of the hollow-moulded structure 710.

The rib 730 has the same function as the ribs 230, 330, 430, 530, 630 described previously.

Figure 11:
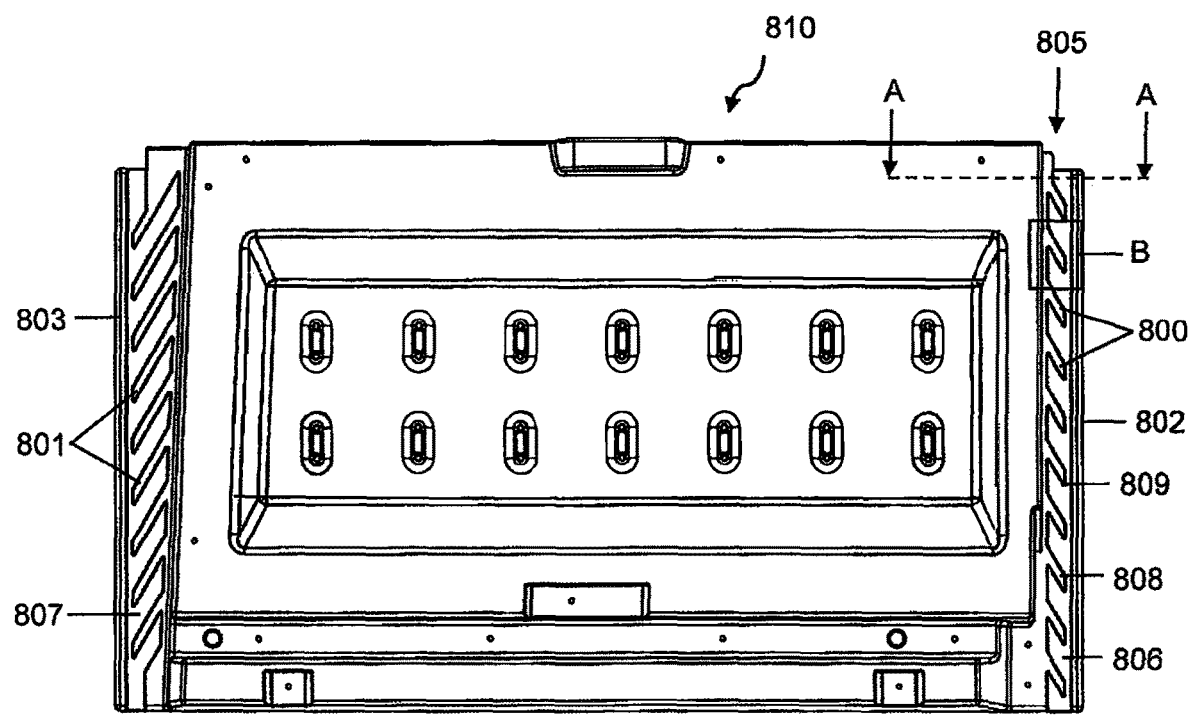
FIG. 11 is a side elevation of a portion of an animal house comprising an end panel with a series of ridges, in accordance with the second aspect of the invention.

FIGS. 11 and 12 show a second aspect of the invention. An alternative solution to the problem of water ingress in the gap between adjacent panels of a hollow-moulded animal house is provided by the second aspect of the invention. There are certain situations where using the rib 230, 330, 430, 530, 630, 730, described above may not be appropriate. One other example where a rib may be difficult to employ is along vertical edge joins between panels. For example, along an edge join, such as a vertical edge join, between a front panel and a side panel of an animal house.

FIG. 11 shows an impermeable hollow-moulded side panel 810 of an animal house having an inward-facing surface 811, a first series of ridges 800 and a second series of ridges 801. FIG. 12, section A-A shows the hollow nature of the side panel 810.

The side panel 810 has a first edge 802, a second edge 803. Adjacent the first edge 802 there is defined a recessed first end portion 806 of the side panel 810. Adjacent the second edge 803 there is defined a recessed second end portion 807 of the side panel 810. The first end portion 806 and the second end portion 807 each define a plane. The planes are substantially aligned with each other, with slight misalignment possible due to manufacturing tolerances. The first series of ridges 800 are arranged along the first end portion 806, and the second series of ridges 801 are arranged along the second end portion 807.

Each series of ridges 800, 801 is substantially the same, so only features of the first series of ridges 800 will be described here in detail. FIG. 12 shows a simplified cross-section through the first end portion 806.

The first series of ridges 800 and the side panel 810 are together a single unitary piece of hollow-moulded plastic. The first series of ridges 800 comprises nine individual ridges 808 connected by a spine 805. The ridges 808 and the spine 805 protrude away from the plane defined by the recessed first end portion 806, to the same extent. As best seen in FIG. 12 the ridges 808 and spine 805 protrude level with the inward-facing surface 811 of the panel 810.

The spine 805 extends along the first end portion 806 of the side panel 810, in parallel to the first edge 802. The ridges 808 of the first series 800 are equally spaced apart from each other and extend away from the spine 805, along the plane defined by the first end portion 806. The ridges 808 may be oriented away from the spine 805 at an angle between 5° and 80°. The ridges 808 of the first series 800 are parallel to each other.

FIG. 12 shows an enlarged perspective view of a ridge of FIG. 11. As shown by FIG. 12, the ridge 808 has substantially curved edges. This may be a result of the hollow-moulding process and limitations, as described previously. In FIG. 12, the ridge 808 has an upper curved edge 888 and a lower curved edge 889 (partially seen in FIG. 12).

In use, the side panel 810 is arranged such that the ridges 808 extend diagonally down and away from the spine 805. The ridges 808 extend at an angle of 30° to the substantially vertical first edge 802. In an alternate embodiment, the ridges 808 may extend from between 5° and 80° to the first edge 802. A back panel 910 is aligned with and fitted against the second end portion 807 of the side panel 810, such that the ridges 808 are opposed to the back panel 910 and a gap is defined therebetween. The side panel 810 and back panel 910 together define a corner of the animal house 900.

Figure 13:
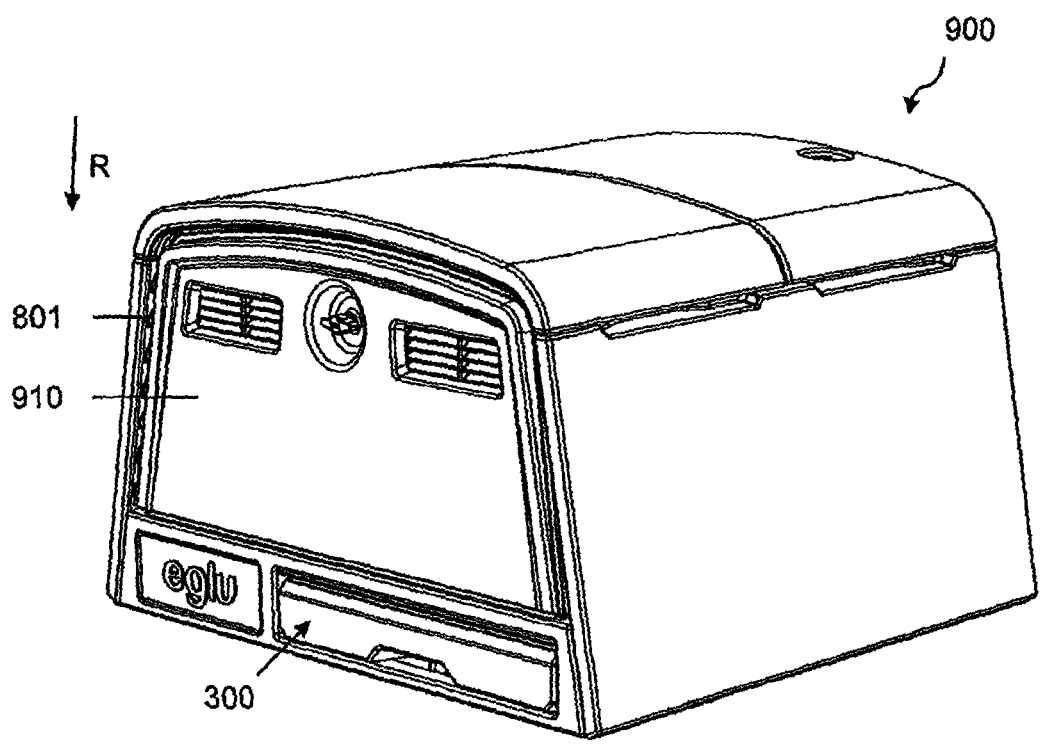
FIG. 13 is a perspective view of an animal house comprising the side panel of FIG. 11.
Figure 14:
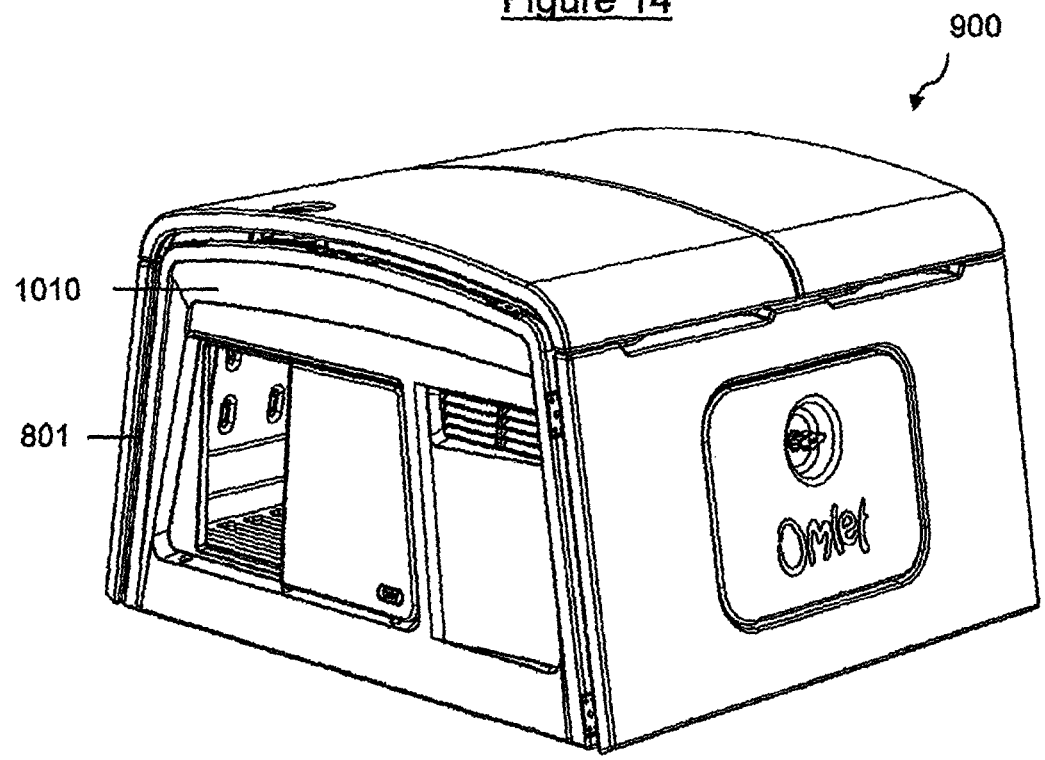
FIG. 14 is a further perspective view of the animal house of FIG. 13.

In the example shown in FIGS. 13 and 14, the side panel 810 and the back panel 910 are arranged vertically, or substantially vertically. In this example, water may track around the edges 802, 803 of the side panel 810, such that the water has a horizontal component to its trajectory. In the absence of the series of ridges 800, 801, water may track around the edges 802, 803 and into inside of the animal house. In the absence of the series of ridges 800, 801, water may also or alternatively track around edges of the back panel 910 in a similar manner.

The series of ridges 800, 801 reduce the likelihood of any tracking water from reaching the inside of the animal house. Water tracking around an edge 802 is represented in FIG. 12, Detail B. Arrow 8 represents a water droplet moving between the side panel 810 and the back panel 910 either under capillary action, or by wind action. Arrow 9 represents the vertical component of the water trajectory due to gravity. The ridge 808 acts as a guide to direct water away from the inside of the animal house. For example, when water reaches the upper curved edge 888, it may be guided along the upper curved edge 888, downwards and away from the inside of the animal house. Alternatively, water may run over the ridge 808, and then be at least partly guided away from the inside of the animal house by the lower curved edge 889. This guiding away from the inside of the animal house is made possible by the angle of the ridges, and due to the curved edges of the ridges.

The ridges each terminate in a relatively sharp end 809. These sharp ends 809 of the ridges 808 cause water to be discouraged from tracking along the hollow-moulded structure towards the inside of the animal house 900. In this respect, this aspect of the invention embodies the same inventive concept as the first aspect of the invention. This aspect of the invention provides an alternative solution to the problem solved by the first aspect of the invention.

The ridges 800, 801 may be suitable for any corner between panels. For example, as shown in FIG. 14, the side panel 810 may be arranged such that the ridges 800, 801 are in contact with a front panel 1010 of the animal house 900.

It will be appreciated that whilst various aspects and embodiments of the present invention have heretofore been described, the scope of the present invention is not limited to the particular arrangements set out herein and instead extends to encompass all arrangements, equivalents, and modifications and alterations thereto, which fall within the scope of the appended claims.

It should also be noted that whilst the accompanying claims set out particular combinations of features described herein, the scope of the present invention is not limited to the particular combinations hereafter claimed, but instead extends to encompass any combination of features herein disclosed.

Finally, it should be noted that any element in a claim that does not explicitly state "means for" performing a specified function, or "steps for" performing a specific function, is not to be interpreted as a "means" or "step" clause as specified in 35 U.S.C. Sec. 112, par. 6. In particular, the use of "step of" in the claims appended hereto is not intended to invoke the provisions of 35 U.S.C. Sec. 112, par. 6.

The invention claimed is:

1. An animal house defining an interior region and an exterior region, the animal house comprising:
    an impermeable hollow-moulded structure having at least one convex surface, a first flat surface extending in a first direction and a second flat surface facing the exterior region, the second flat surface extending in a second direction and defining a plane, the at least one convex surface connecting the first flat surface to the second flat surface;
    a top wall connected to an outer wall and to an inner wall, the top wall defining a first gap with the at least one convex surface, wherein the top wall is moveable laterally with respect to the at least one convex surface and is not restrained for movement by the impermeable hollow-moulded structure;
    a rib defining a sharp edge wherein the rib terminates in the sharp edge and the sharp edge terminates proximate to the plane of the second flat surface; and
    wherein the rib is adapted to be releasably attached proximate to or on the at least one convex surface such that the rib diverts a liquid flowing over the at least one convex surface away from the second flat surface and away from the first gap.

2. The animal house according to claim 1, wherein the convex surface has a radius of curvature of between 1 mm and 100 mm.

3. The animal house according to claim 1, wherein the rib has a planar portion, and the rib is attached to the first flat surface of the structure at the planar portion of the rib.

4. The animal house according to claim 1, wherein the sharp edge is offset from the first flat surface, defining a second gap therebetween.

5. The animal house according to claim 1, wherein a planar portion of the rib is adapted to form a seal with the first flat surface of the structure.

6. The animal house according to claim 1, wherein the rib has a portion extending in the first direction.

7. The animal house according to claim 1, wherein the first direction and the second direction are orthogonal.

8. The animal house according to claim 7, wherein the first direction is vertical and the second direction is horizontal.

9. The animal house according to claim 1, wherein the convex surface of the structure comprises a material having a surface tension value between 20 mN/m and 50 mN/m.

10. The animal house according to claim 1, wherein the convex surface of the structure comprises a polymeric material.

11. The animal house according to claim 1, wherein the structure is a blow moulded structure.

12. The animal house according to claim 1, wherein the rib is a single unitary piece.

13. The animal house according to claim 1, wherein the rib comprises two or more attachable unitary pieces.

14. The animal house according to claim 1, wherein the rib has a cross-section, the cross-section being one of: an L-shape; a Z-shape; an arc shape; a top-hat shape; or rectangular.

15. The animal house according to claim 1, wherein the first flat surface of the structure defines a flat-bottomed channel, and the rib is adapted to be partially received within the channel.

16. The animal house according to claim 1, wherein the impermeable hollow moulded structure is a wall panel or a roof panel of the animal house.

17. An animal house comprising:
impermeable structure means including an impermeable hollow-moulded panel, said impermeable hollow-moulded panel having at least one convex surface, a first flat surface extending in a first direction and a second flat surface extending in a second direction, the at least one convex surface connecting the first flat surface to the second flat surface;
a movable part spaced from the at least one convex surface and defining a gap between the at least one convex surface and the movable part;
liquid diverting means defining a sharp edge; and
wherein the liquid diverting means is configured to be releasably attached proximate to or on the at least one convex surface such that the liquid diverting means diverts a liquid flowing over the at least one convex surface away from the movable part and away from the gap, wherein movement of the movable part is movable laterally and is not restrained for movement by the impermeable hollow-moulded panel.

* * * * *